UNITED STATES PATENT OFFICE.

JAMES WEBSTER, OF BIRMINGHAM, COUNTY OF WARWICK, ENGLAND.

PROCESS OF MANUFACTURING FLUX.

SPECIFICATION forming part of Letters Patent No. 394,233, dated December 11, 1888.

Application filed November 17, 1885. Serial No. 183,105. (No specimens.) Patented in England October 15, 1885, No. 12,344; in France November 3, 1885, No. 172,038, and in Belgium November 5, 1885, No. 70,746.

*To all whom it may concern:*

Be it known that I, JAMES WEBSTER, engineer, a subject of the Queen of Great Britain, residing at Birmingham, in the county of Warwick, England, have invented an Improved Process for the Manufacture of Flux from Waste Fluids containing Calcium Chloride, (for which I have made application for Letters Patent in Great Britain and Ireland October 15, 1885, No. 12,344; in France November 3, 1885, No. 172,038, and in Belgium November 5, 1885, No. 70,746;) and I do hereby declare that the following specification is a full, clear, and exact description of the said invention, and one which will enable others skilled in the art to which it appertains to make and use the same.

My invention relates to an improved process of manufacturing a flux from any waste fluids containing calcium chloride, and which flux is adapted for the purpose of refining metals.

The process which I make use of according to my invention is partly extractive and partly synthetic.

In carrying my invention into effect I make use of the waste fluid from any chemical works in which calcium chloride is found in sufficient quantity. Among those branches of manufacturing chemistry which yield a fluid suitable for the purpose of my invention I instance the manufacture of ammonium carbonate from ammonium chloride, although I would have it distinctly understood that this is not the only chemical industry which yields a waste fluid adapted for use as the raw material of my invention.

I first fill a tank of convenient proportions with the waste fluid and throw into it as much slaked lime as suffices to form a stiff paste. This stiff paste of saturated lime is then to be removed to a drying-stove, the temperature of which is to be gradually raised to about 250° Fahrenheit, but not higher. During the process of drying the mass is to be well stirred or raked about. This raking and the limited temperature effect the evaporation of all the water, but without affecting the chemical nature of the mass. The tank is filled a second time with fluid and the dried mass from the drying-stove thrown in. When it has absorbed as much fluid as it is capable of taking up, it is subjected to a second drying conducted as above described. As this second drying is progressing a number of lumps will be formed, which is indicative of the absorption by the lime of calcium chloride from the fluid. At the conclusion of the second drying the mass may be ground to enable it to absorb more fluid with greater readiness. The tank having in the meantime been filled a third time with fluid, the ground mass is thrown therein and stirred about until it is thoroughly saturated, and then dried as before. I find that this dried mass of supersaturated lime is, as a rule, incapable of absorbing any more of the chlorine compounds from the fluid after the third immersion if the processes described above have been carefully performed; but I do not confine myself to three immersions of the lime in the fluid followed by three dryings, inasmuch as the number can be varied if required or desirable, provided that the lime be allowed to take up and retain as large a proportion of the chlorine compounds of the fluid as it is capable of doing, this absorption of the calcium chloride by the immersed lime being an essential feature of my process, and its presence consequently necessary to the success of my invention. I find that if the lime be immersed twice only the melting (next to be described) cannot be carried out. The dried mass is, after the third immersion, introduced into a furnace of the well-known reverberatory type, worked at a glowing red heat, at which the mass readily melts, and is drawn off as a viscid mass of a mixed brown and dirty yellow color and cast into blocks for convenience in dealing with it. As the blocks cool they turn black and are highly caustic and deliquescent. It is therefore necessary to take proper precautions against their being unduly exposed to the weather.

The melting process above described must not be carried on at too high a temperature. If the temperature be raised unduly above that specified—viz., a glowing red heat—the molten mass will solidify and fall to a white powder.

In carrying out the process above described I do not confine myself to any particular arrangement of plant, as the size and relative numbers of vats and furnaces may be varied according to circumstances or convenience or the special requirements of any particular installation. I wish also to point out, in order that my process may not be confounded with any of the numerous and well-known methods of manufacturing cements, plasters, artificial marbles, and the like, that the fusibility of my flux at a glowing red heat in an ordinary reverberatory furnace, as well as its black color and deliquescence, show conclusively how wide a difference there must necessarily be between any process for the manufacture of cements, plasters, artificial marbles, and the like from lime and magnesia bases and the process hereinbefore described.

The best methods of using the flux manufactured as above described are fully set forth in a subsequent application for Letters Patent filed April 6, 1886, Serial No. 198,008, and I hereby disclaim any intention of laying claim to the use of said flux in any metallurgical operations; but What I do claim is—

A process of manufacturing a flux for use in metallurgical operations, which process consists in repeatedly immersing lime in waste fluid containing calcium chloride until it is incapable of absorbing any more chlorine compounds therefrom, drying the saturated lime after each immersion at a temperature not exceeding 250° Fahrenheit, and melting the dried mass of supersaturated lime after the last immersion in a reverberatory furnace by heating it to a glowing red heat, substantially as hereinbefore set forth.

In testimony whereof I have hereunto set my hand.

JAMES WEBSTER.

Witnesses:
F. W. F. WEBSTER,
*Heathhouse, Solehull Lodge, near Birmingham.*
WM. MUIR,
*Solehull Lodge, near Birmingham.*